United States Patent [19]

Meixner et al.

[11] Patent Number: 4,585,828
[45] Date of Patent: Apr. 29, 1986

[54] EMULSIFIABLE RADIATION-CURABLE ACRYLOYL-CONTAINING POLYESTERS, A PROCESS FOR THEIR PREPARATION AND THEIR USE

[75] Inventors: Jürgen Meixner, Krefeld; Hans-Joachim Traenckner, Fallingbostel; Wolfgang Kremer, Kerken; Manfred Müller, Erkelenz, all of Fed. Rep. of Germany

[73] Assignee: Bayer Aktiengesellschaft, Leverkusen, Fed. Rep. of Germany

[21] Appl. No.: 665,566

[22] Filed: Oct. 29, 1984

[30] Foreign Application Priority Data

Nov. 10, 1983 [DE] Fed. Rep. of Germany ....... 2340589

[51] Int. Cl.$^4$ ...................... C08L 67/06; C08G 63/20
[52] U.S. Cl. .................................... 524/604; 528/301; 526/320; 525/921
[58] Field of Search ................... 523/502; 525/34, 41, 525/42, 48, 921; 528/301; 526/320; 524/604; 204/159.19

[56] References Cited

U.S. PATENT DOCUMENTS

| | | | |
|---|---|---|---|
| 4,100,127 | 7/1978 | Fukusaki | 525/43 |
| 4,206,025 | 6/1980 | Urancken | 204/159.16 |
| 4,281,068 | 7/1981 | Frank | 521/62 |
| 4,330,643 | 5/1982 | Ogasawara | 525/445 |
| 4,333,865 | 6/1982 | Zuckert | 523/410 |
| 4,451,509 | 5/1984 | Frank | 427/54.1 |

FOREIGN PATENT DOCUMENTS

| | | |
|---|---|---|
| 3106570 | 11/1982 | Fed. Rep. of Germany . |
| 2343761 | 7/1977 | France . |
| 2025996 | 1/1980 | United Kingdom . |

Primary Examiner—Melvyn I. Marquis
Assistant Examiner—Patricia Short
Attorney, Agent, or Firm—Connolly & Hutz

[57] ABSTRACT

The invention relates to acryloyl-containing polyesters having acid numbers AN of 1–50 mg of KOH/g of substance and having been polymerized from cocondensed units of (A) 1.0 mole of at least one dicarboxylic anhydride,
(B) 0.02–0.08 mole of at least one saturated dihydric polyether alcohol having a molecular weight $\overline{M}n$ of about 1,000 to 2,000,
(C) 0.48–0.42 mole of at least one dihydric saturated alcohol,
(D) 1.0 mole of at least one trihydric saturated oxyalkylated alcohol with a degree of oxyalkylation of 2–6, up to 50 mole-% of said oxalkylated alcohol may be replaced by a trihydric, saturated, non-oxalkylated alcohol, and
(E) 1.0–2.0 moles of acrylic acid, to a process for their preparation, and to their use as radiation-curable binders in aqueous emulsion preferably for coating wood and woodlike materials, for which the presence of customary external surface-active agents and reactive radiation-curable diluents is not necessary.

9 Claims, No Drawings

EMULSIFIABLE RADIATION-CURABLE ACRYLOYL-CONTAINING POLYESTERS, A PROCESS FOR THEIR PREPARATION AND THEIR USE

The invention relates to emulsifiable radiation-curable acryloyl-containing polyesters, to a process for their preparation, and to their use. The aqueous emulsions of these polyesters are preferably used for coating wood and woodlike materials. They can be used in this way without the presence of customary external surface-active agents and reactive radiation-curable diluents.

Acryloyl-containing polyesters which can be cured by radiation in the absence of solvents have been known for some time. The desired processing viscosities of such binder systems are obtained by adding copolymerisable reactive diluents. However, addition of these low-viscosity substances reduces the curing rate of the binder. Furthermore, these reactive diluents are physiologically not safe.

These disadvantages can be avoided by using aqueous binder emulsions.

There are already a large number of existing aqueous emulsions based on acryloyl-bearing polyesters. For instance, U.S. Pat. No. 4,033,920 discloses anionic aqueous emulsions incorporating self-emulsifying binders. The self-emulsifiability of the binders is obtained by neutralising free carboxyl groups with bases such as alkali metal hydroxide solutions or amines. These emulsions have the disadvantage that the neutralising agents used speed up the hydrolysis of the ester groups in the binder. Furthermore, these neutralising agents remain in the paint film, at least to some extent, and reduce its resistance to water. If the neutralising agent is an amine it can cause yellowing of the paint film. Another disadvantage is the thickening action which these binders with their ionic groups bring about in the water.

German Offenlegungsschrift No. 2,853,921 (=U.S. Pat. No. 4,287,039) describes radiation-curable aqueous binder emulsions which consist of water, at least one polymerisable prepolymer containing C—C double bonds, an external dispersant and a photoinitiator. The dispersion is prepared by dispersing the prepolymer dissolved in an inert organic solvent in water by means of dispersants such as polyvinylpyrrolidone and/or vinylpyrrolidone/vinyl ester copolymers. Afterwards the organic solvent is removed by distillation. This process has the disadvantage that a great deal of energy is required for the dispersing as a result of the need to distil off the solvent. Furthermore, the dispersants used do not become part of the paint film. As a result, the degree of resistance to water which is obtainable for this paint film is generally reduced.

German Offenlegungsschrift No. 2,804,216 (=U.S. Pat. No. 4,281,068) discloses preparing aqueous emulsions of mixtures of unsaturated polyesters. 5–50% by weight of the mixture of the unsaturated polyesters consist of one or more unsaturated polyesters which contain cocondensed polyalkylene glycols and allyloxy groups. They act as built-in emulsifiers. However, such emulsifier-type polyesters are unsuitable for emulsifying acryloyl-containing prepolymers, since they cause gelling of the mixture within a short time.

German Offenlegungsschrift No. 3,200,907 (U.S. Pat. No. 4,451,509) describes aqueous radiation-curable emulsions of mixtures of polyesters with built-in emulsifiers and acryloyl-bearing prepolymers.

The emulsifier-type polyesters contain alkyleneoxy and benzyloxy groups but no reactive acryloyl groups and therefore they are not comparable to the emulsifiable radiation-curable acryloyl-containing polyesters of the present Application.

Earlier German Offenlegungsschrift No. 3,241,264.9 (filed on Nov. 9, 1982 but not issued prior to the present Application) discloses polyester emulsifiers which can formally be regarded as condensation products of one mole of a polyethylene and/or polypropylene glycol ether (molecular weights $\overline{M}n$ about 300–6,000), 2 moles of a dicarboxylic acid and 2 moles of an oxyalkylated partially (meth)acryloylated saturated trihydric to hexahydric aliphatic alcohol. These emulsifier-type polyesters are recommended for emulsifying radiation-curable (meth)acryloyl-containing prepolymers.

The person skilled in the art will also known that incorporating polyalkylene glycols into polyesters leads to water-emulsifiable or even water-soluble products. However, in order to be readily dilutable with water, polyesters have to have a high polyalkylene glycol content. That in turn leads to paint films of insufficient resistance to water (see Comparative Example 3).

It is the object of the present invention to provide radiation-curable water-emulsifiable acryloyl-containing prepolymers free of reactive diluents. This object is to be achieved without the use of external emulsifiers and/or solvents as emulsifying auxiliaries. The paint films obtained from the emulsions should be rapidly curable by radiation, and they should be highly resistant to water and have good physical properties (such as, for example, hardness).

This object is achieved by preparing acryloyl-containing polyesters of a certain composition in two stages. In the first stage, dicarboxylic anhydrides are reacted with diols which are partly polyalkylene glycols. In the second stage, the product of the first stage is then further esterified with oxyalkylated trihydric saturated alcohols and with acrylic acid.

The present invention thus provides acryloyl-containing polyesters having acid numbers AN of 1–50 mg of KOH/g of substance and consisting of cocondensed units of (A) 1.0 mole of at least one dicarboxylic anhydride,
(B) 0.02–0.08 mole of at least one saturated dihydric polyether alcohol having a molecular weight $\overline{M}n$ of about 1,000 to 2,000,
(C) 0.48–0.42 mole of at least one dihydric saturated alcohol,
(D) 1.0 mole of at least one trihydric saturated oxyalkylated alcohol with a degree of oxyalkylation of 2–6, up to 50 mole-% of said oxyalkylated alcohol may be replaced by a trihydric saturated, non-oxalkylated alcohol and
(E) 1.0–2.0 moles, preferably 1.3–2.0 moles, of acrylic acid.

Examples of dicarboxylic anhydrides which can be used are maleic anhydride, citraconic anhydride, tetrahydrophthalic anhydride, hexahydrophthalic anhydride and phthalic anhydride. Maleic anhydride is preferred.

The saturated dihydric polyether alcohols are preferably polyalkylene glycols having 2 to 4 C atoms in the alkylene group. Polyethylene glycols having molecular weights $\overline{M}n$ between 1,000 and 2,000 are particularly preferred.

Examples of the dihydric saturated alcohols are ethylene glycol, 1,2-propylene glycol, 1,3-propylene glycol, butane-1,2-diol, butane-1,3-diol, butane-1,4-diol, pentane-1,3-diol, hexane-1,6-diol and 2-ethylhexanediol. Ethylene glycol and 1,2-propylene glycol are preferred.

The trihydric saturated oxyalkylated alcohols are prepared by oxyalkylating the corresponding trihydric saturated alcohols in a degree of oxyalkylation which can be 2 to 6. Examples of trihydric saturated alcohols are glycerol, trimethylolethane and trimethylolpropane. Trimethylolpropane having a degree of oxyalkylation of about 4 is preferred.

The degree of oxyalkylation indicates the number of moles of 1,2-alkylene oxide which, on average, has been added onto one mole of triol. Suitable 1,2-alkylene oxides are ethylene oxide, propylene oxide or mixtures thereof.

The present invention also provides a process for preparing acryloyl-containing polyesters having acid numbers of 1–50 mg of KOH/g of substance, characterised in that the starting materials are
(A) 1.0 mole of at least one dicarboxylic anhydride,
(B) 0.02–0.08 mole of at least one saturated dihydric polyether alcohol having a molecular weight $\overline{M}n$ of about 1,000 to 2,000,
(C) 0.48–0.42 mole of at least one dihydric saturated alcohol,
(D) 1.0 mole of at least one trihydric saturated oxyalkylated alcohol with a degree of oxyalkylation of 2–6, up to 50 mole-% of said oxalkylated alcohol may be replaced by a trihydric, saturated, non-oxalkylated alcohol and
(E) 1.0–2.0 moles, preferably 1.3–2.0 moles, of acrylic acid, and, in a first stage, said components (A), (B) and (C) are heated at temperatures of 75° C. to 130° C. in a water-insoluble solvent under nitrogen for three to eight hours, then, in a second stage, said components (D) and (E) are added in succession or mixed, and the resulting mixture is heated at temperatures of 75° C. to 130° C. in the presence of an acid catalyst and of an inhibitor under azeotropic conditions until no more water separates off and the remaining solvent begins to distil over.

It is also possible, instead of reacting components (A), (B) and (C) in the first stage and then adding and condensing (D) and (E) in a further stage, to carry out the first stage with components (A) and (B) and the second stage with components (C), (D) and (E). The sequence of (A), (B) and (C) in the first stage, followed by (D) and (E) in the second stage, is preferred.

Examples of acid catalysts for speeding up the esterification are sulphuric acid, p-toluenesulphonic acid and naphthalenesulphonic acid. They are used in amounts of 0.1 to 3% by weight, relative to the total amount of components (A) to (E). If desired, it is also possible to use more than one catalyst.

The acid numbers of the polyesters can be 1 to 50, preferably 2 to 20, mg of KOH per g of substance.

In order to protect the products according to the invention from undesirable premature polymerisation, it is advisable to add 0.01–0.3% by weight, relative to the total amount of (A) to (E), of one or more polymerisation inhibitors or antioxidants at as early a stage as the synthesis of the products. Suitable stabilisers are described in, for example, "Methoden der organischen Chemie" [Methods of Organic Chemistry] (Houben-Weyl), 4th edition, volume XIV/1, pages 433 et seq., Georg Thieme Verlag, Stuttgart 1961.

The presnt invention also provides for the use of the polyesters as radiation-curable binders in aqueous emulsion systems.

The emulsions can contain 10–70% by weight, preferably 30–70% by weight, of the reaction products according to the invention. The emulsions can be prepared by stirring water into the products, for example by simply stirring or by means of dissolvers.

To form a finely dispersed emulsion, it is advantageous to add the water a little at a time at temperatures below 30° C. Efficient shearing will then produce oil-in-water emulsions.

The reaction products according to the invention can contain the components required for achieving particular technical effects, such as fillers, pigments, dye-stuffs, thixotropic agents, smoothing agents, masking agents for cutting out the inhibiting effect of the air, delustrants, flow-control agents and the like, in customary amounts.

The emulsions are highly suitable for processing on conventional paint lines equipped with casting machines. The emulsions can also be applied by roll-coating and spraying. Preferably the substrate is made of wood or is a woodlike product, for example an imitation-veneer plastic film.

The curing is effected with ionising, for example high-energy, electrons or, in the presence of photoinitiators, with UV radiation, advantageously not until the water has escaped from the paint film. As a rule, in paints of customary thickness (10–200 μm dry film thickness), film formation through the escape of water only takes a short time even if no heat is supplied. If desired, said film formation can also be carried out at temperatures up to 100° C.

The photoinitiator can be any of those compounds which are known anyhow for radiation-curing purposes, such as, for example, benzophenone, or, quite generally, an aromatic keto compound, an alkylbenzophenone, a halogenomethylated benzophenone as described in DE-OS (German Published Specification) No. 1,949,010, a Michler ketone, an anthrone or a halogenated benzophenone. Anthraquinone and a large number of its derivatives, for example β-methylanthraquinone, tert.-butylanthraquinone and anthraquinonecarboxylic acid esters, likewise make for effective photoinitiators, as do oxime esters as described in DE-OS (German Published Specification) No. 1,795,089. Also suitable are phenylglyoxylic acid esters are described in DE-OS (German Published Specification) No. 2,825,955.

Preferably the photoinitiator is benzoin or one of its derivatives as described, for example, in DE-OS (German Published Specification) Nos. 1,769,168, 1,769,853, 1,769,854, 1,807,297, 1,807,301 and 1,919,678 and DE-AS (German Published Specification) No. 1,694,143, or a benzil ketal, such as, for example, benzil dimethyl ketal, or a hydroxyalkylphenone, such as, for example, 2-hydroxy-2-methyl-1-phenylpropan-1-one.

The photoinitiator can be added to the reaction product before emulsification or, if solubility in water is adequate, to the emulsion.

EXAMPLES

In the following Examples the percentages are by weight. The viscosity measurements were carried out at 20° C. in a Höppler falling ball viscometer (DIN No. 53,015).

In all Examples, the condensation was carried out at 70% strength in toluene in the presence of 0.75% of p-toluenesulphonic acid as the catalyst and 0.08% of p-methoxyphenol+0.08% of di-tert.-butylhydroquinone as inhibitors, all percentages being relative to the total amount of components (A) to (E).

Starting components (A) to (C) listed in Tables 1 and 2 below are heated in toluene under N₂ at 110° to 120° C. for 6 hours. After addition of components (D) and (E), the catalyst and the inhibitors the mixture is held at 110° to 130° C. until no more water separates off. After the residue has cooled down to 50°-90° C. the solvent is distilled off in vacuo.

The resistance to water of the films cured by UV radiation was tested by wetting the films with water and evaluating them after a period of 16 hours at room temperature. The cured coatings were examined for their resistance to chemicals by wetting them with a mixture of water and ethanol in a ratio of 1:1, with ethyl acetate or with acetone and evaluating them 8 hours later. "Resistant to water" and "resistant to chemicals" signify that there was no visible change to the film, i.e. no spots developed, nor did the film soften and become detached from the substrate.

TABLE 1

| | Starting materials (moles) | Examples in accordance with the invention | | | | | |
|---|---|---|---|---|---|---|---|
| | | 1 | 2 | 3 | 4 | 5 | 6 |
| (A) | Maleic anhydride | 1.0 | 1.0 | 1.0 | 1.0 | 1.0 | — |
| | Phthalic anhydride | — | — | — | — | — | 1.0 |
| (B) | Polyethylene glycol 1,000 | — | — | — | 0.07 | — | — |
| | Polyethylene glycol 1,500 | 0.02 | 0.03 | 0.05 | — | — | 0.03 |
| | Polyethylene glycol 2,000 | — | — | — | — | 0.023 | — |
| (C) | Ethylene glycol | — | 0.47 | — | — | — | — |
| | 1,2-propylene glycol | 0.48 | — | 0.45 | 0.43 | 0.48 | 0.47 |
| (D) | Oxyethylated trimethylolpropane (degree of oxyethylation: 4) | 1.0 | 1.0 | 1.0 | 1.0 | 1.0 | 1.0 |
| (E) | Acrylic acid | 1.7 | 1.8 | 1.8 | 1.8 | 1.8 | 1.8 |
| | Properties of polyester: | | | | | | |
| | Acid number (mg of KOH/g of substance) | 10 | 13 | 13 | 11 | 11 | 37 |
| | Viscosity (mPas) | 9,600 | 6,800 | 5,700 | 6,200 | 6,500 | 10,100 |

To prepare the emulsions, 250 g each of the novel polyesters of Examples 1-6 together with, in each case, 5 g of photoinitiator, namely 1-(4-isopropylphenyl)-2-hydroxy-2-methylpropan-1-one, mixed in each case with 110 g of water, are sheared at 8,000 revolutions per minute in a dissolver for 2 minutes and are then adjusted with water to a solids content of 50% by stirring (1,000 revolutions per minute). The results are oil-in-water emulsions which are very stable (namely for longer than 6 months at room temperature).

Applied in an amount of 70 g/m² to a wood surface, the above emulsions incorporating polyesters of Examples 1-6 are processed at a processing speed of at least 8 m/min into 35 μm thick paint films which are perfectly resistant to water and chemicals and have König pendulum hardness values (DIN No. 53,157) of 70 to 100 sec. by subjecting the applied emulsions to radiation from an IST radiator (pulsed radiator supplied by the firm of Strahlentechnik Hildebrand, Werner und Pfleiderer, output 80 watt/cm, radiator distance 20 cm) after the water has been evaporated off at 50° C. in the course of 7 minutes.

No emulsifiable polyester resins are formed if, as following Comparative Examples 1 and 2 will show, a procedure is chosen other than that described in claims 2 and 3:

COMPARATIVE EXAMPLE 1

Example 1 is repeated word for word, except that mixture (A) to (D) is heated in the first stage in place of mixture (A) to (C), affording a polyester of the following characteristics: acid number: 16, viscosity: 10,500 mPas.

COMPARATIVE EXAMPLE 2

Example 1 is repeated word for word, except that all components (A) to (E) are heated together at 110°-130° C. in toluene until no more water separates off instead of being heated in two separate stages, affording a polyester of the following characteristics: acid number 18; viscosity: 10,125 mPas.

Neither the polyester resin of Comparative Example 1 nor that of Comparative Example 2 can be emulsified in water without additive.

If the amounts of polyalkylene glycol are increased beyond the upper claimed limit, it is even possible, as Comparative Example 3 will show, to emulsify in water a polyester prepared in a single-stage procedure. However, the resistance to water of a UV-cured film obtained from the polyester is insufficient.

COMPARATIVE EXAMPLE 3

1.0 mole of maleic anhydride, 0.1 mole of polyethylene glycol (molecular weight 1,500), 0.4 mole of 1,2-propylene glycol, 1.0 mole of oxyethylated trimethylolpropane (degree of oxyethylation: 4) and 1.8 moles of acrylic acid are dissolved in sufficient toluene to form a 70% strength solution which, after addition of catalyst and inhibitors, is heated at 110°-130° C. until no more water separates off. When the residue has cooled down the solvent is distilled off at 30°-90° C. in vacuo. The polyester obtained has an acid number of 13 and crystallises out after some time. This polyester, if treated as described in Examples 1-6, can be used to prepare a stable 50% strength emulsion.

However, paint films prepared and cured in accordance with the conditions of Examples 1-6 are not resistant to water. After 16 hours of wetting with water they become completely detached from the wood surface.

Table 2 shows comparison products which each contain, in place of a component according to the invention, a component which is not in accordance with the invention but which is similar. The method of preparation used is in accordance with the invention. The polyesters of the Comparative Examples differ from the polyesters according to the invention in terms of the following parameters.

| Comparative Examples | |
|---|---|
| 4 | Trimethylolpropane (TMP) in place of oxyethylated TMP |
| 5 | Oxyalkylated pentaerythritol in place of oxyethylated TMP, |
| 6 | Polyethylene glycol having a molecular weight below 1,000; |
| 7 | Polyethylene glycol having a molecular weight above 2,000; |
| 8 | Fumaric acid in place of a dicarboxylic anhydride. |

TABLE 2

| | Starting materials (moles) | Comparative Examples | | | | |
|---|---|---|---|---|---|---|
| | | 4 | 5 | 6 | 7 | 8 |
| A | Maleic anhydride | 1.0 | 1.0 | 1.0 | 1.0 | — |
| | Fumaric acid | — | — | — | — | 1.0 |
| B | Polyethylene glycol 1,550 | 0.03 | 0.03 | — | — | 0.03 |
| | Polyethylene glycol 600 | — | — | 0.08 | — | — |
| | Polyethylene glycol 4,000 | — | — | — | 0.012 | — |
| | (Numbers = molecular weights) | | | | | |
| C | 1,2-propylene glycol | 0.47 | 0.47 | 0.42 | 0.48 | 0.47 |
| D | Oxyethylated trimethylolpropane (degree of oxyethylation: 4) | — | — | 1.0 | 1.0 | 1.0 |
| | Oxyalkylated pentaerythritol (5 moles of propylene oxide and 10 moles of ethylene oxide per mole of pentaerythritol) | — | 1.0 | — | — | — |
| | Trimethylolpropane | 1.0 | — | — | — | — |
| E | Acrylic acid | 1.8 | 2.5 | 1.8 | 1.8 | 1.8 |
| | Acid number | | 12 | 12 | 11 | 18 |
| | Viscosity of the polyester (mPa · s) | gel | 3,000 | 6,500 | crystalline | 2,300 |

The polyester of Comparative Example 4 is a gel and therefore not emulsifiable. The polyester resins of Comparative Examples 5 to 8 do not produce oil-in-water emulsions without additive.

We claim:

1. A process for preparing an acryloyl-containing polyester having an acid number of 1-50 mg of KOH/g of substance, from starting materials comprising:
   (A) 1.0 mole of at least one dicarboxylic anhydride,
   (B) 0.02-0.08 mole of at least one saturated dihydric polyether alcohol having a molecular weight $\overline{M}n$ of about 1,000 to 2,000,
   (C) 0.48-0.42 mole of at least one dihydric saturated alcohol selected from ethylene glycol, 1,2-propylene glycol, 1,3-propylene glycol, butane-1,2-diol, butane-1,3-diol, butane-1,4-diol, pentane-1,3-diol, hexane-1,6-diol or 2-ethylhexanediol,
   (D) 0.5 to 1.0 mole of at least one trihydric saturated oxyalkylated alcohol with a degree of oxyalkylation of 2-6 and 0.5 to 0 mole of at least one trihydric saturated non-oxyalkylated alcohol, and
   (E) 1.0-2.0 moles of acrylic acid by the steps comprising in a first stage, heating said components (A), (B) and (C) at temperatures of 75° C. to 130° C. in a water-insoluble solvent under nitrogen for three to eight hours, then, in a second stage, adding said components (D) and (E) simultaneously or in succession, and heating the resulting mixture at temperatures of 75° C. to 130° C. in the presence of an acid catalyst and of an inhibitor under azeotropic conditions until no more water separates off and the remaining solvent begins to distil over.

2. A process according to claim 1, wherein the dihydric saturated alcohol is ethylene glycol or 1,2 propylene glycol.

3. A process according to claim 1, wherein components (A) and (B) are added in succession during the first stage.

4. A process according to claim 3, wherein the dihydric saturated alcohol is ethylene glycol or 1,2 propylene glycol.

5. An acryloyl-containing polyester having an acid number of 1-50 mg of KOH/g of substance comprising cocondensed units of
   (A) 1.0 mole of at least one dicarboxylic anhydride,
   (B) 0.02-0.08 mole of at least one saturated dihydric polyether alcohol having a molecular weight $\overline{M}n$ of about 1,000 to 2,000,
   (C) 0.48-0.42 mole of at least one dihydric saturated alcohol,
   (D) 0.5 to 1.0 mole of at least one trihydric saturated oxyalkylated alcohol with a degree of oxyalkylation of 2-6 and 0.5 to 0 mole of a trihydric saturated non-oxyalkylated alcohol and
   (E) 1.0-2.0 moles of acrylic acid, prepared by the steps comprising heating said components (A), (B) and (C) at temperatures of 75° C. to 130° C. in a water-insoluble solvent under nitrogen for three to eight hours, then, in a second stage, adding said components (D) and (E) simultaneously or in succession and heating the resulting mixture at temperatures of 75° C. to 130° C. in the presence of an acid catalyst and of an inhibitor under azeotropic conditions until no more water separates off and the remaining solvent begins to distil over.

6. An acryloyl-containing polyester according to claim 5, wherein the dihydric saturated alcohol is ethylene glycol or 1,2 propylene glycol.

7. An acryloyl-containing polyester according to claim 5, wherein components (A) and (B) are added in succession during the first stage.

8. An acryloyl-containing polyester according to claim 6, wherein components (A) and (B) are added in succession during the first stage.

9. An aqueous emulsion containing an acryloyl-containing radiation-curable polyester as claimed in claim 5.

* * * * *